United States Patent
Karlsson et al.

(10) Patent No.: US 7,318,788 B2
(45) Date of Patent: Jan. 15, 2008

(54) GEARSHIFT PROCEDURE FOR VEHICLES WITH ENGAGED CLUTCH-DEPENDENT POWER TAKE-OFF

(75) Inventors: Svante Karlsson, Västra Frölunda (SE); Erik Lauri, Mölndal (SE); Marcus Steen, Angered (SE)

(73) Assignee: Volvo Lastvagnar AB, Goteborg (SE)

( * ) Notice: Subject to any disclaimer, the term of this patent is extended or adjusted under 35 U.S.C. 154(b) by 100 days.

(21) Appl. No.: 11/160,906

(22) Filed: Jul. 14, 2005

(65) Prior Publication Data

US 2006/0116238 A1 Jun. 1, 2006

Related U.S. Application Data

(63) Continuation of application No. PCT/SE2004/000030, filed on Jan. 14, 2004, now abandoned.

(30) Foreign Application Priority Data

Jan. 14, 2003 (SE) .................................. 0300077

(51) Int. Cl.
*B60W 10/00* (2006.01)
(52) U.S. Cl. ............................................. 477/78
(58) Field of Classification Search ............ 477/78, 477/109, 111
See application file for complete search history.

(56) References Cited

U.S. PATENT DOCUMENTS

| | | | |
|---|---|---|---|
| 4,493,228 A * | 1/1985 | Vukovich et al. | 477/109 |
| 4,593,580 A * | 6/1986 | Schulze | 477/109 |
| 5,299,129 A | 3/1994 | Uchida et al. | |
| 5,435,212 A * | 7/1995 | Menig | 74/745 |
| 5,611,751 A | 3/1997 | Ehrenhardt et al. | |
| 5,755,639 A * | 5/1998 | Genise et al. | 477/111 |
| 5,904,635 A * | 5/1999 | Genise et al. | 477/111 |
| 6,080,081 A | 6/2000 | Sauermann et al. | |
| 6,123,642 A * | 9/2000 | Saito et al. | 477/3 |
| 6,364,810 B1 * | 4/2002 | Hughes | 477/124 |
| 6,524,222 B2 * | 2/2003 | Ootsuka | 477/109 |
| 6,878,097 B2 * | 4/2005 | Lemon | 477/109 |
| 7,077,024 B2 * | 7/2006 | Lauri et al. | 74/325 |

* cited by examiner

*Primary Examiner*—Dirk Wright
(74) *Attorney, Agent, or Firm*—Novak Druce & Quigg, LLP

(57) ABSTRACT

Method and arrangement for providing an automatic gearshift procedure for a vehicle with engaged clutch-dependent power take-off (32) when the vehicle is in motion. The power take-off (32) is driven by an engine (1) via an automated disk clutch (3) and an automatic stage-geared gearbox (9) in which an intermediate shaft (11) for driving the power take-off (32) is arranged. The control unit (45) controls the gearbox (9), the disk clutch (3) and the engine (1) so that shifting when the vehicle is in motion can take place even with an engaged clutch-dependent power take-off (32).

7 Claims, 2 Drawing Sheets

GEARSHIFT PROCEDURE FOR VEHICLES WITH ENGAGED CLUTCH-DEPENDENT POWER TAKE-OFF

CROSS-REFERENCE TO RELATED APPLICATIONS

The present application is a continuation patent application of International Application No. PCT/SE2004/000030 filed 14 Jan. 2004 which was published in English pursuant to Article 21(2) of the Patent Cooperation Treaty, and which claims priority to Swedish Application No. 0300077-5 filed 14 Jan. 2003. Said applications are expressly incorporated herein by reference in their entireties.

FIELD OF THE INVENTION

The present invention relates to a procedure for motor vehicles directed toward an automatic gearshift procedure with the vehicle in driving mode and a simultaneously engaged clutch-dependent power take-off. The power take-off is arranged on the gearbox of the vehicle.

BACKGROUND OF THE INVENTION

In order for it to be possible to handle the load on a truck effectively, load-handling equipment is necessary. The most common examples of such equipment are tipping gear and cranes. Also common are hook loaders, refuse-handling units, rotating cement mixers, flushing units and air compressors for loading or unloading bulk loads.

In order to utilize the driving power of the vehicle engine to drive the load-handling equipment as well, a power take-off is required. The driving power from the power take-off can be transmitted either mechanically via a propeller shaft or belts or hydraulically by virtue of a hydraulic pump being mounted on the power take-off.

Power take-offs are divided into clutch-independent and clutch-dependent power take-offs. The clutch-dependent power take-offs are mounted on the gearbox and are usually driven by the intermediate shaft of the gearbox. This means that the power take-off is clutch-dependent; that is to say, the power take-off stops when the disk clutch between the engine and gearbox of the vehicle is disengaged. Depending on whether or not the gearbox is equipped with a split gear, the ratio between the engine and the power take-off can be influenced.

Automatic gearboxes of the automated stage-geared gearbox type have become increasingly common in heavy-duty vehicles as microcomputer technology has developed further and made it possible, with a control computer and a number of actuators, for example servo motors, to precision-regulate engine speed, engagement and disengagement of an automated disk clutch between the engine and the gearbox and also the internal coupling means of the gearbox in such a way and in relation to one another so that gentle shifting is always obtained at the correct rotational speed.

The advantage of this type of automatic gearbox compared with a conventional automatic gearbox constructed with planetary gear stages and with a hydrodynamic torque converter on the input side is on the one hand that, especially as far as use in heavy-duty vehicles is concerned, it is simpler and more robust and can be manufactured at a considerably lower cost than the conventional automatic gearbox and on the other hand that it has higher efficiency, which means lower fuel consumption is possible.

When shifting of any unsynchronized gears included in the gearbox takes place, the speed is synchronized by precision control of the rotational speed of the engine. The disk clutch between the engine and the gearbox is therefore engaged so that the rotational speed of the main shaft and the rotational speed of the intermediate shaft are adapted to a new ratio selected. The engine speed is regulated depending on the fuel quantity injected and the engine brake.

When the shifting of synchronized gears takes place, the speed adaptation is effected by means of synchronizing rings.

According to known arrangements for the abovementioned type of automated stage-geared gearbox, clutch-dependent power take-offs are suitable for load-handling equipment which is used when the vehicle is stationary or when the vehicle is driven only in the starting gear, for example tipping units, cranes, hook loaders, pumps for emptying/filling from various containers and air compressors for loading or unloading bulk loads. As the power take-off loads the synchronization system when shifting takes place, it is not permitted for the power take-off to be engaged when shifts take place when the vehicle is being driven. The clutch-dependent power take-off is engaged when the engine of the vehicle is running at idling speed, the gearbox of the vehicle is in its neutral position (or alternatively a starting gear) and the disk clutch between the engine and the gearbox is disengaged. When the disk clutch is engaged, the engine drives the power take-off.

Typically, the vehicle is stationary during this engagement procedure. This also applies for disengagement of the power take-off.

The driver of a vehicle with a clutch-dependent power take-off of known design is therefore limited to using the clutch-dependent power take-off when the vehicle is stationary or if a starting gear is engaged owing to the fact that the vehicle can only be driven in this gear at the same time as the power take-off is engaged. When the vehicle is in motion, the power take-off is therefore restricted to being utilized only in a single starting gear in the selected driving direction. Shifting when the vehicle is in motion with clutch-dependent power take-off engaged is not possible according to these known designs. Here, motion means that the speed of the vehicle is high enough that the lowest gear of the vehicle can be engaged without there being a risk of the engine being throttled down.

A need therefore exists in a vehicle equipped with a clutch-dependent power take-off and an automated stage-geared gearbox for it to be possible to use the clutch-dependent power take-off of the vehicle when the vehicle is in motion and with the possibility of shifting between all the gears of the vehicle throughout the speed range of the vehicle.

SUMMARY OF THE INVENTION

The procedure according to the present invention describes an automatic gearshift procedure for a vehicle with engaged clutch-dependent power take-off when the vehicle is in motion. The power take-off is driven by an engine, arranged in the vehicle, via a disk clutch which in turn is coupled to an automatic stage-geared gearbox in which at least one intermediate shaft used for driving the power take-off is arranged. The gearbox and the engine are controlled by at least one control unit, the gearshift procedure according to the invention being characterized by the steps: (i) the control unit controls the torque of the engine so that the main shaft of the gearbox becomes torqueless or virtually torqueless; (ii) the control unit puts the gearbox in neutral position so that the intermediate shaft of the gearbox is disengaged from the driving wheels of the vehicle; and (iii) the control unit controls the speed of the engine to synchronous speed with regard to the new gear and the control unit engages the new gear.

The advantage of the procedure according to the invention is that it becomes possible to shift while underway at the same time as the clutch-dependent power take-off is engaged and being used. This is effected mainly by virtue of, before the gearbox is put in neutral position, ensuring that the main shaft in the gearbox becomes as close to torqueless as possible. The loading applied to the power take-off is therefore compensated by the intermediate shaft being subjected to a torque corresponding to the torque which load connected up to the power take-off brings about but in the opposite direction. This can be effected by, for example, precision-control of the engine of the vehicle. By making the main shaft torqueless, shifting becomes possible in spite of the power take-off being engaged and driving some form of unit. It is easier for different configurations of units to be driven by the power take-off to be installed in the vehicle. This also includes units which, according to the state of the art, have to be driven by a clutch-independent power take-off. It is therefore possible with the aid of the procedure according to the invention to drive all types of unit by means of the clutch-dependent power take-off irrespective of whether the vehicle is stationary or in motion.

It may also be pointed out that the vehicle can be driven in all gears, both forward and reverse, with the power take-off engaged throughout the speed range of the vehicle. On upshifting, it will be possible for the loading on the power take-off to be used as an engine brake and intermediate shaft brake, that is to say the loading applied to the power take-off can be utilized in order to speed up the reduction in speed of the rotational speed of the intermediate shaft and of the engine so that the rotational speed is synchronized more rapidly with the new, higher gear (lower ratio).

In a first preferred embodiment of the procedure according to the invention, the invention is also used when a split gear arranged in the gearbox is to be shifted in combination with one of the basic gears being shifted (according to the procedure illustrated above). The control unit then performs the following steps in addition to the procedure above: (i) the control unit controls the torque of the engine so that the input shaft of the gearbox becomes torqueless or virtually torqueless; (ii) the control unit disengages the disk clutch so that the engine of the vehicle is disengaged from the driving wheels of the vehicle; (iii) the control unit controls the speed of the engine to synchronous speed with regard to the new split gear; (iv) the control unit engages the new split gear; and (v) the control unit couples the disk clutch together.

The power take-off can therefore remain engaged even when a split gear arranged in the gearbox is shifted in combination with a basic gear being shifted.

A second preferred embodiment of the procedure according to the invention illustrates how the control unit acts when the vehicle goes from being in motion to stationary or virtually stationary and a throttle control arranged in the vehicle is let up. The control unit then performs the following steps: (i) the control unit registers that a throttle control arranged in the vehicle is let up; (ii) the control unit, when the speed of the vehicle is lower than a predetermined value and the vehicle is decelerating more than a predetermined value, controls the torque of the engine so that the main shaft of the gearbox becomes torqueless or virtually torqueless and puts the gearbox in neutral position so that the intermediate shaft of the gearbox is disengaged from the driving wheels of the vehicle.

The control unit therefore registers that the speed of the vehicle has been reduced to such an extent that the highest ratio (lowest gear) of the gearbox is not sufficient. The gearbox therefore remains in the neutral position until the throttle control is actuated again. The power take-off therefore remains engaged. The predetermined engine speed is preferably adapted to a unit connected up to the power take-off.

In a third preferred embodiment of the procedure according to the invention, the throttle control of the vehicle is actuated again after a temporary stationary period and the control unit then acts according to the following steps: (i) the control unit disengages the disk clutch; (ii) the control unit engages a starting gear different from neutral position; and (iii) the control unit couples the disk clutch together in a suitable way.

By virtue of the driver actuating the throttle control again, the control unit therefore registers that the driver wishes to set the vehicle in motion. The control unit selects and engages a suitable starting gear and couples the disk clutch together again in a suitable way so that the vehicle rolls off. The power take-off remains engaged throughout the stopping procedure, that is to say the driver can utilize the power take-off when the vehicle goes from motion to stationary. When the vehicle is to be started again, the power take-off is disengaged for a short period of time by virtue of the disk clutch being disengaged. Such a gearshift procedure for stopping/starting can be utilized during, for example, a temporary stop at a red light and when the driver simultaneously wishes to have the power unit engaged.

In other preferred embodiments of the procedure of the present invention, the torque of the input shaft and/or the loading of the power take-off is/are measured. The advantage of measuring the torque on the input shaft is that the output torque of the engine and the degree of engagement of the disk clutch can be controlled more accurately. The wear on the disk clutch is minimized. The advantage of measuring the torque at the power take-off is that, together with the information about the torque of the input shaft, it is possible, for example, for the output torque of the engine to be controlled so that the main shaft becomes torqueless. This also reduces the stresses on the coupling devices for the gear concerned in the basic gearbox when a basic gear is disengaged.

Another advantage of measuring the torque at the power take-off is that better control is obtained when the loading from the equipment connected up to the power take-off is to be utilized for engine braking on upshifting. Upshifts can therefore be optimized, and, in vehicles equipped with an engine braking device which can be utilized to speed up upshifts, the wear on the engine braking device is reduced. The loading on the power take-off can be registered via a torque transmitter arranged at the power take-off.

Further embodiments of the invention emerge from the dependent patent claims.

BRIEF DESCRIPTION OF THE DRAWINGS

The present invention will be described in greater detail below with reference to the accompanying drawings, which, for the purpose of exemplification, show further preferred embodiments of the invention and also the technical background, and in which.

DETAILED DESCRIPTION

Figure 1:
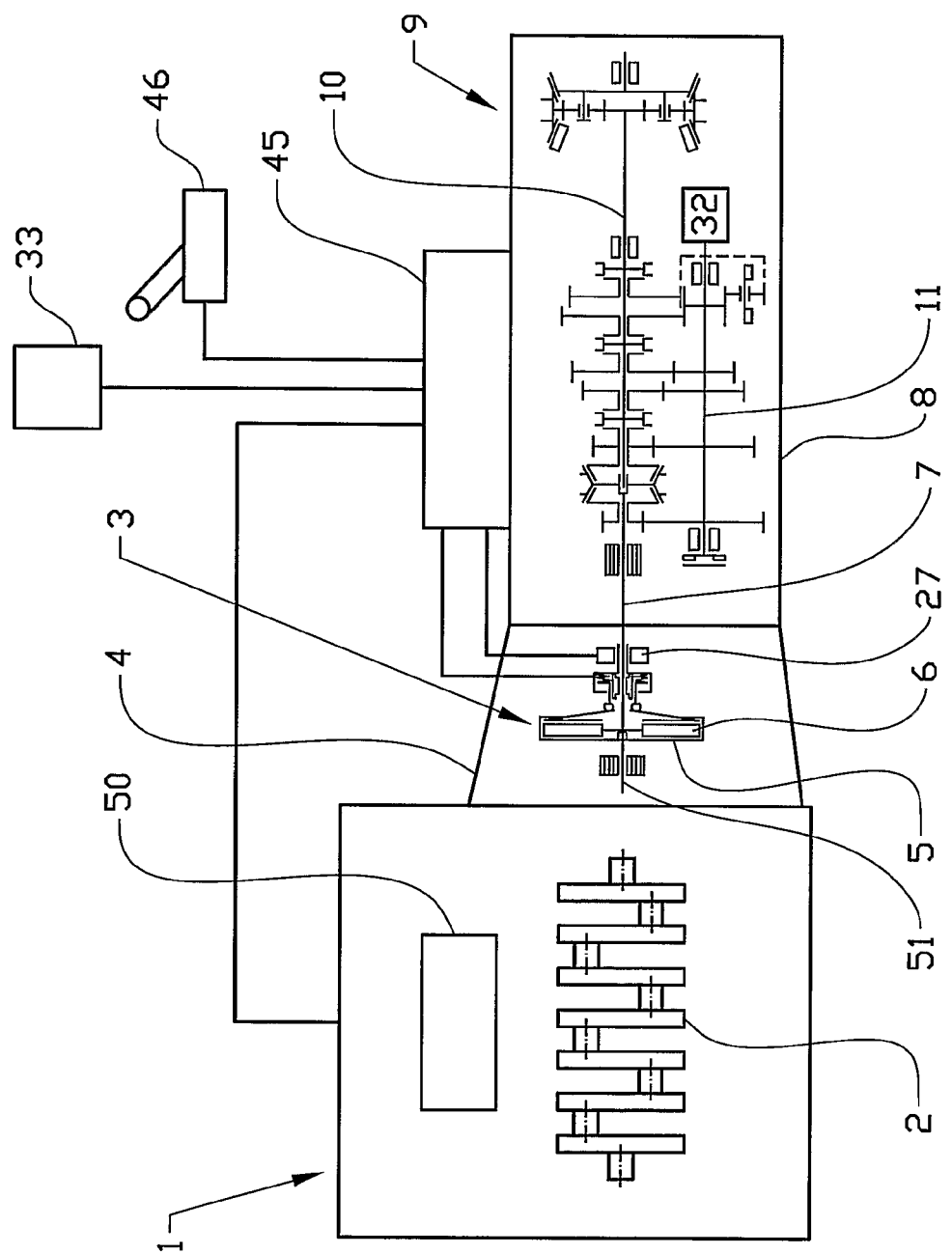
FIG. 1 shows a diagrammatic representation of an internal combustion engine with adjacent clutch and gearbox with power take-off.

In FIG. 1, reference number 1 designates a six-cylinder internal combustion engine, for example a diesel engine, the crankshaft 2 of which is coupled to a single-plate dry disk clutch, designated generally by reference number 3, which is enclosed in a clutch case 4. The crankshaft 2 is, via the output shaft 51 of the engine, which shaft is connected to the flywheel (not shown), connected non-rotatably to the clutch housing 5 of the disk clutch 3, while its plate 6 is connected non-rotatably to an input shaft 7 which is mounted rotatably in the casing 8 of a gearbox designated generally by reference number 9. A main shaft 10 and an intermediate shaft 11 are also mounted rotatably in the casing 8.

Figure 2:
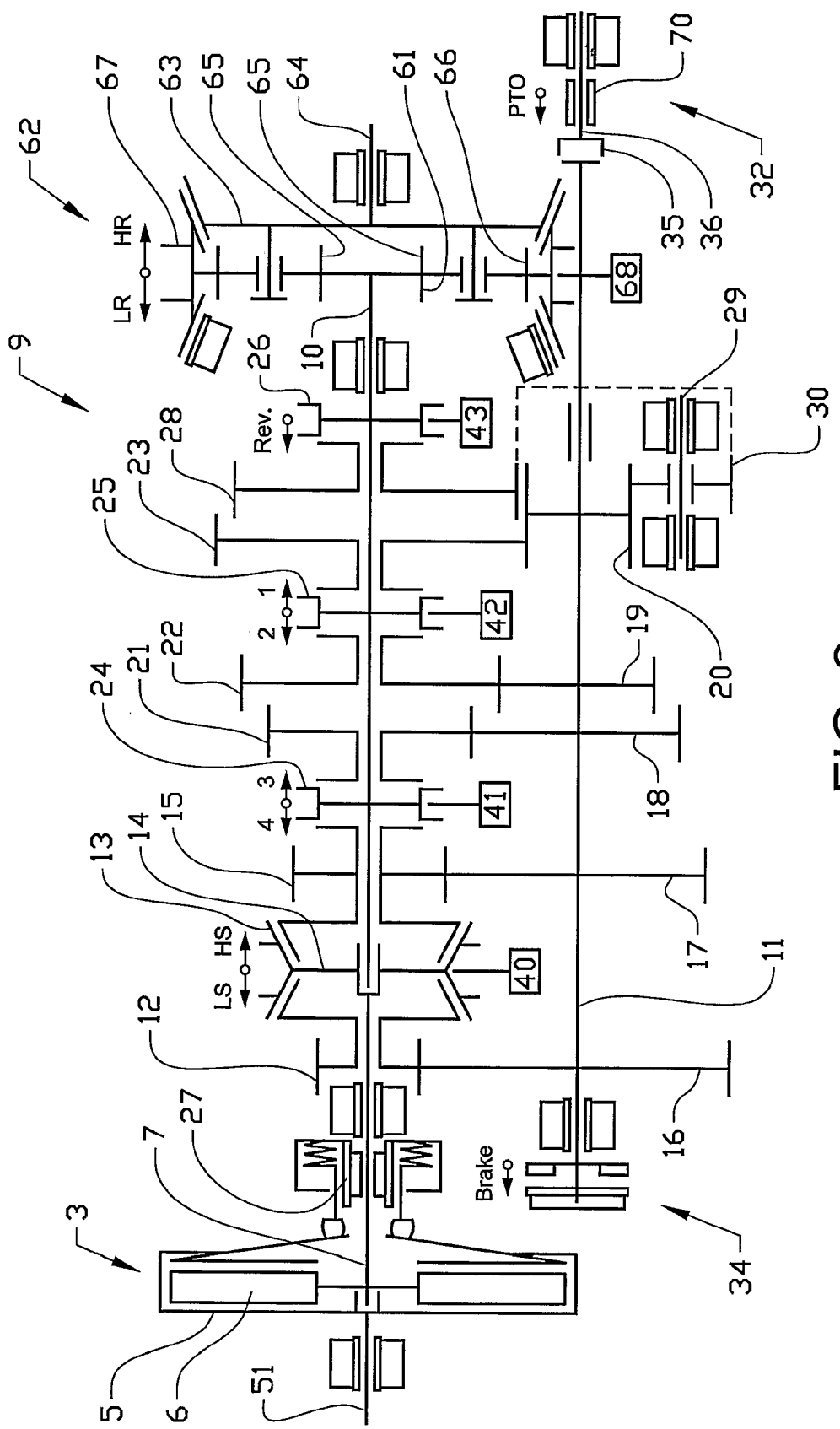
FIG. 2 shows the clutch and the gearbox in FIG. 1 on enlarged scale.

As can be seen most clearly from FIG. 2, a gearwheel 12 is mounted rotatably on the input shaft 7 and is lockable on the shaft by means of a coupling sleeve 13 which is provided with synchronizing means and is mounted non-rotatably but axially displaceably on a hub 14 connected non-rotatably to the input shaft 7. By means of the coupling sleeve 13, a gearwheel 15 mounted rotatably on the main shaft 10 is also lockable relative to the input shaft 7. With the coupling sleeve 13 in a central position, both the gearwheels 12 and 15 are disengaged from their shafts 7 and, respectively, 10. The gearwheels 12 and 15 engage with gearwheels 16 and, respectively, 17 which are connected non-rotatably to the intermediate shaft 11. Arranged in a rotationally fixed manner on the intermediate shaft 11 are further gearwheels 18, 19 and 20 which engage with gearwheels 21, 22 and, respectively, 23 which are mounted rotatably on the main shaft 10 and are lockable on the main shaft by means of coupling sleeves 24 and, respectively, 25 which, in the illustrative embodiment shown, do not have synchronizing devices. A further gearwheel 28 is mounted rotatably on the main shaft 10 and engages with an intermediate gearwheel 30 which is mounted rotatably on a separate shaft 29 and in turn engages with the intermediate shaft gearwheel 20. The gearwheel 28 is lockable on its shaft by means of a coupling sleeve 26.

The gearwheel pairs 12, 16 and 15, 17 and the coupling sleeve 13 form a synchronized split gear with a low gear stage LS and a high gear stage HS. The gearwheel pair 15, 17 also forms, together with the gearwheel pairs (21, 18), (22, 19) and (23, 20) and the three gearwheels 28, 20 and 30, a basic gearbox with four forward gears and one reverse gear. In the illustrative embodiment shown, the output end of the main shaft 10 is connected to a range gear stage which in turn can be connected to a propeller shaft (not shown) which conveys the driving power out to the driving wheels (not shown).

Arranged in a rotationally fixed manner on the output end of the main shaft 10 is a gearwheel 61 which forms the sun gear in a two-stage range gear of planetary type which is designated by reference number 62 and the planet-wheel carrier 63 of which is connected in a rotationally fixed manner to a shaft 64 which forms the output shaft of the gearbox. The output shaft 64 of the gearbox is connected to the propeller shaft (not shown). The planet wheels 65 of the range gear 62 engage with a ring gear 66 which, by means of a coupling sleeve 67, is lockable relative to the gearbox casing 8 for low range LR and relative to the planet-wheel carrier 63 for high range HR. An alternative is for the output end of the main shaft 10 to be connected directly to the propeller shaft, that is to say the gearbox 9 does not then have a range gear stage.

The coupling sleeves 13, 24, 25, 26 and 67 are displaceable as shown by the arrows in FIG. 2, the gear stages shown in conjunction with the arrows being obtained. The coupling sleeves 13, 24, 25, 67 each have three positions, two gear positions and a neutral position (central position). The coupling sleeve 26 has one gear position and a neutral position. The displacement of the coupling sleeves is brought about by respective servo devices 40, 41, 42, 43 and 68 indicated diagrammatically in FIG. 2, which can be pneumatically operated piston/cylinder arrangements of the type used in a gearbox of the kind described above which is marketed under the name I-shift.

The servo devices 40, 41, 42, 43 and 68 are controlled by an electronic control unit 45 (see FIG. 1), comprising (including, but not necessarily limited to) a microcomputer, depending on signals fed into the control unit representing various engine and vehicle data comprising at least engine speed, vehicle speed, throttle pedal position and, where appropriate, engine brake on/off, when an electronic gear selector 46 coupled to the control unit 45 is in its automatic shifting position. When the selector is in the position for manual shifting, shifting takes place at the command of the driver via the gear selector 46.

The control unit 45 requests engine speed and/or engine torque from the engine control unit 50 which controls the fuel injection.

In FIGS. 1 and 2, reference number 32 designates a clutch-dependent power take-off coupled to the intermediate shaft 11. The power take-off usually consists of a housing (not shown) mounted on the side or rear end wall of the gearbox 9. By means of an engaging and disengaging device 35, the input shaft 36 of the power take-off 32 can be connected in a rotationally fixed manner to the intermediate shaft 11.

The engaging and disengaging device 35 of the power take-off 32 is controlled by the control unit 45. The control unit 45 receives a request for engagement and disengagement of the power take-off 32 from a device 33 for controlling the power take-off 32, which device 33 is connected to the control unit 45.

The device 33 may be a control which is operated by the driver of the vehicle or an automatic arrangement which, via some form of sensor for example, senses a parameter change, which initiates engagement or disengagement of the power take-off 32. When the power take-off 32 is engaged, it is therefore driven by the engine 1 via the disk clutch 3, the split gear 12, 16 or 15, 17 and also the intermediate shaft 11. The power take-off 32 is usually equipped with one or more gearing possibilities on the at least one output shaft (not shown) of the power take-off. A desired unit to be driven is coupled to the output shaft of the power take-off 32.

The procedure according to the invention makes shifting possible when the clutch-dependent power take-off is engaged and the vehicle is in motion.

According to a preferred embodiment of the invention, the control unit 45 is programmed to register that the power take-off 32 is engaged. This can be affected by sensors (not shown) for sensing whether the power take-off 32 is engaged or disengaged, or in another known manner, for example by registering the status of the device 33 for controlling the power take-off 32. When the control unit 45 registers that the power take-off 32 is engaged, the control unit 45 controls the gearbox 9 according to the gearshift procedure according to the invention. When the control unit 45, according to the gearshift procedure according to the invention, decides to shift, the control unit 45 controls the speed of the engine 1 so that the main shaft 10 becomes torqueless. The torquelessness of the main shaft 10 is achieved by continuously sensing the torque at the power take-off 32 and by knowing the torque on the input shaft 7. Torque-sensing at the power take-off 32 is effected with the aid of a torque transmitter 70 arranged on the input shaft 36 of the power take-off 32. Torque-registering on the input shaft 7 of the gearbox 9 can be effected by means of a torque transmitter 27 arranged at the input shaft 7 or on the basis of engine torque calculated through fuel quantity supplied with deductions for engine friction and other losses which load the engine 1 (generator, cooling fan, clutch-independent power take-off). Knowledge of the torque at the power take-off 32 and the torque on the input shaft 7 of the gearbox makes it possible, taking the ratio between the input shaft 7 and the intermediate shaft 11 into account, for the torque on the intermediate shaft 11 to be balanced by controlling the engine 1. When the torque on the input shaft 7 is sufficiently great that it cancels out the torque on the intermediate shaft 11, the main shaft 10 becomes torqueless. When the main shaft 10 is torqueless, an engaged gear in the basic gearbox can be disengaged with minimal wear on the component parts of the gear concerned, and the gearbox is therefore in neutral position, that is to say the intermediate shaft 11 is disengaged from the driving wheels of the vehicle and the power take-off 32 continues to be driven by the engine 1 via the disk clutch 3, the input shaft 7 of the gearbox and the intermediate shaft 11.

If the control system 45, after the gearbox 9 has been put in neutral position, decides to engage a new gear, the control unit 45 controls the speed of the engine 1 so that the speed of the engine 1 and of the intermediate shaft 11 becomes synchronous with the new gear selected. Depending on gear selected and synchronous speed having been achieved, the control system 45 gives a signal in a known manner to the servo device concerned, that is to say one of 41, 42 and 43, to engage the new gear in the basic gearbox. Synchronous speed having been achieved is registered in a known way by, for example, tachometers (not shown).

If the speed of the vehicle is lower than a predetermined value and too low even for the lowest gear of the vehicle, and the vehicle is decelerating more than a predetermined value at the same time as a throttle control (not shown) arranged in the vehicle is let up fully, the control system 45 registers the low speed and opts to keep the gearbox 9 in the neutral position. The control unit 45 then controls the speed of the engine 1 to a predetermined speed adapted for equipment connected up to the power take-off 32.

When the driver of the vehicle wishes the vehicle to start moving again, the driver actuates the throttle control so that the control system 45 registers in a known way that driving power is required. According to an advantageous embodiment of the invention, the control unit 45 will then control the engine 1 so that the input shaft 7 becomes as torqueless as possible. In this way, wear of the disk clutch 3 when the subsequent disengagement of the engine 1 from the gearbox 9 takes place by disengagement of the disk clutch 3 is minimized. When the disk clutch 3 is disengaged, the control unit 45 waits until the intermediate shaft 11 is as close to stationary as possible. The braking of the speed of the intermediate shaft 11 is speeded up by virtue of the power take-off 32 being engaged throughout with loading from a unit connected up to the power take-off 32. In a preferred embodiment (see FIG. 2), the gearbox 9 is equipped with an intermediate shaft brake 34 which is controlled by the control unit 45. The intermediate shaft 11 can therefore be braked by both the power take-off 32 and the intermediate shaft brake 34 or only one of the power take-off 32 and the intermediate shaft brake 34.

When the speed of the intermediate shaft 11 has been adapted to the starting gear selected, the control unit 45 engages the starting gear. When the starting gear is engaged, the control unit 45 engages the disk clutch 3 in a suitable, known manner so that the engine 1 can start to drive the driving wheels of the vehicle and the vehicle is set in motion in the selected direction. The power take-off 32 will be without drive for a short period of time because the intermediate shaft 11 is stationary for a short period of time as above.

In the illustrative embodiments shown in the figures, the gearbox 9 is equipped with a split gear part 12, 13, 14, 15, 16, 17. When the control unit 45 decides to change split gear and basic gear, the control unit 45, according to one embodiment of the invention, controls the speed of the engine 1 so that the main shaft 10 becomes torqueless and the gear engaged in the basic gearbox is disengaged, as described above. When the control unit 45 has disengaged the basic gear, the control unit 45 controls the speed of the engine 1 so that the input shaft becomes as close to torqueless as possible, and then disengages the disk clutch 3 (as described above). The control unit 45 then controls the engine 1 to synchronous speed with the new ratio in the gearbox 9 at the same time as the split gear 12, 16, 15, 17 is shifted. The speed difference between the input shaft 7 and the intermediate shaft 11 is synchronized in a manner known per se, preferably with the aid of a mechanical synchronizing device arranged in the split gear. The synchronizing device is indicated in the figures by the cone-shaped coupling sleeve 13. When the new split gear is engaged, the control unit 45 engages the disk clutch 3 in a suitable manner known per se. When the disk clutch 3 is engaged, the control unit 45 controls the speed of the engine 1 to synchronous speed with the basic gear selected. When synchronous speed has been achieved, the control unit 45 engages the basic gear selected and the engine 1 is controlled to the driving torque requested by the driver of the vehicle through the throttle control.

In an alternative embodiment, shifting of split gear and basic gear can take place in sequence, that is to say that, for example, the split gear is shifted first by, in a known way, the disk clutch 3 being disengaged, the split gear 12, 16, 15, and 17 being shifted and the disk clutch 3 being coupled together again, and the basic gear is then shifted according to the embodiment according to the invention described above. The basic gear can of course be shifted before the split gear.

In the illustrative embodiment shown, the gearbox is equipped with a range gear stage 62. Shifting of the range gear 62 preferably takes place in parallel with shifting of a basic gear, that is to say when the gearbox 9 is in neutral position. The range shifting itself takes place in a known manner at the same time as basic shifting according to the procedure according to the invention described above takes place.

According to an advantageous embodiment of the invention, the control unit 45 is programmed to adapt the gear selection in the basic gearbox taking account of equipment (not shown) driven by the power take-off 32 and the present or future state of the vehicle in other respects. The speed of the engine 1 is adapted to the gear which has been selected before the gear is engaged. When the basic gearbox is engaged and the engine 1 can therefore continue to drive the vehicle in the selected direction of motion, the engine torque is controlled to the driving torque requested by the driver.

The invention can also be applied to gearboxes without split gear and/or range gear.

The invention can also be applied to gearboxes with one or more synchronized gears in the basic gearbox.

In another embodiment of the invention, an electric motor (for example an Integrated Starter Generator, Integrated Starter Alternator) is arranged between the engine 1 and the gearbox 9 or is in some way coupled to the crankshaft 2 of the engine. Instead of controlling the internal combustion engine 1 of the vehicle in order to adapt torque and speed, the electric motor (not shown) can be controlled so that adaptation of torque and speed takes place in the various embodiments of the invention. Another alternative is to control output torque from the internal combustion engine and the electric motor together.

If units have been connected up to the power take-off which are not to be driven when the vehicle has stopped, for example salt spreaders, the control unit can in an alternative embodiment be programmed so that the disk clutch is preferably disengaged as soon as the vehicle is about to stop. The power take-off is thus also disengaged as the gearbox is disengaged from the engine.

The invention is not to be considered as being limited to the illustrative embodiments described above, but a number of further variants and modifications are conceivable within the scope of the patent claims below.

What is claimed is:

1. An automatic gearshift procedure for a vehicle with engaged clutch-dependent power take-off (32) when the vehicle is in motion, which power take-off (32) is driven by an engine (1), arranged in the vehicle, via a disk clutch (3) which in turn is coupled to an automatic stage-geared gearbox (9) in which at least one intermediate shaft (11) used for driving the power take-off (32) is arranged, and where the gearbox (9) and the engine (1) are controlled by at least one control unit (45), said gearshift procedure comprising:
   while maintaining engagement of the clutch-dependent power take-off (32),
   controlling the torque of the engine (1) via the control unit (45) so that the main shaft (10) of the gearbox (9) becomes substantially torqueless;
   using the control unit (45) to put the gearbox (9) in neutral position so that the intermediate shaft (11) of the gearbox (9) is disengaged from the driving wheels of the vehicle;
   using the control unit (45) to control the speed of the engine (1) to synchronous speed with regard to the new gear; and
   engaging the new gear using the control unit (45).

2. The automatic gearshift procedure as recited in claim 1, wherein a split gear (12, 13, 14, 15, 16, 17) is arranged in the gearbox (9) and the disk clutch (3) is automated, and where, when shifting to a gear takes place which also includes another split gear position in addition to the new gear selected, the gearshift procedure further comprises:
   controlling the torque of the engine (1) via the control unit (45) so that the input shaft (7) of the gearbox (9) becomes torqueless or virtually torqueless;
   disengaging the disk clutch (3) using the control unit (45) so that the engine (1) of the vehicle is disengaged from the driving wheels of the vehicle;
   controlling the speed of the engine (1) via the control unit (45) to a synchronous speed with regard to the new split gear;
   engaging the new split gear via the control unit (45); and
   coupling the disk clutch (3) together using the control unit (45).

3. The automatic gearshift procedure as recited in claim 2, wherein the procedure further comprises said split shifting taking place before or after the gearshift procedure.

4. The automatic gearshift procedure as recited in claim 1 wherein before the control unit (45) controls the torque of the engine (1) so that the main shaft (10) of the gearbox (9) becomes torqueless takes place, the procedure further comprises:
   registering, via the control unit (45), that a throttle control arranged in the vehicle is let up; and
   utilizing the control unit (45), when the speed of the vehicle is lower than a predetermined value and the vehicle is decelerating more than a predetermined value, to control the torque of the engine (1) so that the main shaft (10) of the gearbox (9) becomes substantially torqueless and puts the gearbox (9) in neutral position so that the intermediate shaft (11) of the gearbox (9) is disengaged from driving wheels of the vehicle.

5. The automatic gearshift procedure as recited in claim 4, wherein the disk clutch (3) is automated and when the throttle control of the vehicle is actuated again the control unit (45) disengages the disk clutch (3) and engages a starting gear different from neutral position and couples the disk clutch (3) together.

6. The automatic gearshift procedure as recited in claim 1, wherein control of the torque of the engine (1) takes place as a function of at least one torque transmitter (27) arranged on the input shaft (7).

7. The automatic gearshift procedure as recited in claim 1, further comprising the control unit (45) registering the loading of the power take-off (32) by means of a torque transmitter (70) arranged at the power take-off (32).

* * * * *